(12) United States Patent
Park

(10) Patent No.: US 9,694,706 B2
(45) Date of Patent: Jul. 4, 2017

(54) SYSTEM AND METHOD FOR REPROGRAMMING OF VEHICLE CONTROLLER

(71) Applicant: Hyundai Motor Company, Seoul (KR)

(72) Inventor: Sung Joon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/833,106

(22) Filed: Aug. 23, 2015

(65) Prior Publication Data

US 2016/0107532 A1    Apr. 21, 2016

(30) Foreign Application Priority Data

Oct. 20, 2014    (KR) .................. 10-2014-0142096

(51) Int. Cl.
   *B60L 11/18*    (2006.01)

(52) U.S. Cl.
   CPC ....... *B60L 11/1838* (2013.01); *Y02T 10/7005* (2013.01); *Y02T 90/16* (2013.01); *Y02T 90/168* (2013.01); *Y04S 30/12* (2013.01)

(58) Field of Classification Search
   CPC .............. B60L 11/1824; B60L 11/1809; B60L 11/1838; H04B 2203/5462; Y02T 10/7005; Y02T 90/16; Y02T 90/168; Y04S 30/12
   USPC ........................................................ 701/22
   See application file for complete search history.

(56) References Cited

U.S. PATENT DOCUMENTS

| 6,459,175 | B1 * | 10/2002 | Potega ................. | B60L 11/185 307/132 M |
| 8,315,930 | B2 * | 11/2012 | Littrell ............... | B60L 11/1824 320/109 |
| 8,875,123 | B2 * | 10/2014 | Shiba ...................... | G06F 8/65 717/173 |
| 9,152,408 | B2 | 10/2015 | Murata et al. | |

(Continued)

FOREIGN PATENT DOCUMENTS

| JP | 2005-349878 A | 12/2005 |
| JP | 2006-352849 A | 12/2006 |

(Continued)

*Primary Examiner* — Fadey Jabr
*Assistant Examiner* — Angelina Shudy
(74) *Attorney, Agent, or Firm* — Mintz Levin Cohn Ferris Glovsky and Popeo, P.C.; Peter F. Corless

(57) ABSTRACT

A system for reprogramming a vehicle controller includes: a plurality of controllers equipped in a vehicle; a battery configured to provide operation power to the plurality of controllers; and a charging control device configured to sense a connection with a charger providing charging power from an external power source to the battery, request latest software version information corresponding to each of the plurality of controllers from the charger through power-line communication (PLC) while the charging power is provided from the charger to the battery, confirm the requested latest software version information, receive upgrade data from the charger, and transmit the received upgrade data to the plurality of controllers. The charging control device assigns different communication frequency bands to the plurality of controllers, respectively, for communicating with the plurality of controllers using PLC, and transmits the upgrade data using the respective communication frequency band assigned to the plurality of controllers.

12 Claims, 7 Drawing Sheets

(56) References Cited

U.S. PATENT DOCUMENTS

| | | | | |
|---|---|---|---|---|
| 9,413,423 B1* | 8/2016 | Pande | .................. | H04B 3/46 |
| 9,614,585 B2* | 4/2017 | Katar | .................. | H04B 3/54 |
| 2004/0123028 A1* | 6/2004 | Kanai | .................. | G06F 11/2089 |
| | | | | 711/113 |
| 2004/0161041 A1* | 8/2004 | Logvinov | .............. | H04B 3/542 |
| | | | | 375/257 |
| 2007/0022197 A1* | 1/2007 | Logvinov | ........... | H04L 12/2812 |
| | | | | 709/226 |
| 2008/0042802 A1* | 2/2008 | Shaffer | .................. | G07C 5/008 |
| | | | | 340/7.2 |
| 2009/0144150 A1* | 6/2009 | Sakakibara | ........... | B60L 11/123 |
| | | | | 705/14.62 |
| 2009/0300595 A1* | 12/2009 | Moran | .................. | G06F 8/65 |
| | | | | 717/170 |
| 2010/0010704 A1* | 1/2010 | Uchida | .................. | B60L 3/0046 |
| | | | | 701/29.6 |
| 2010/0074304 A1* | 3/2010 | Flammer, III | ....... | H04B 1/7156 |
| | | | | 375/134 |
| 2010/0082559 A1* | 4/2010 | Sumcad | .................. | G06F 8/65 |
| | | | | 707/695 |
| 2010/0228413 A1 | 9/2010 | Fujitake | | |
| 2011/0060831 A1* | 3/2011 | Ishii | .................. | H04N 7/181 |
| | | | | 709/224 |
| 2011/0215758 A1* | 9/2011 | Stahlin | .................. | G07C 5/008 |
| | | | | 320/109 |
| 2011/0307882 A1* | 12/2011 | Shiba | .................. | G06F 8/65 |
| | | | | 717/173 |
| 2012/0029728 A1* | 2/2012 | Hirayama | ........... | B60L 11/1838 |
| | | | | 701/1 |
| 2012/0112697 A1* | 5/2012 | Heuer | .................. | B60L 11/1818 |
| | | | | 320/109 |
| 2012/0139489 A1* | 6/2012 | Gaul | .................. | B60L 11/1816 |
| | | | | 320/109 |
| 2012/0146590 A1* | 6/2012 | Chiu | .................. | H02J 7/0073 |
| | | | | 320/155 |
| 2012/0221703 A1* | 8/2012 | Schwager | .................. | B60L 1/04 |
| | | | | 709/223 |
| 2012/0309455 A1* | 12/2012 | Klose | .................. | B60L 11/1838 |
| | | | | 455/557 |
| 2012/0330494 A1 | 12/2012 | Hendrix et al. | | |
| 2013/0132939 A1 | 5/2013 | Murata et al. | | |
| 2013/0179057 A1 | 7/2013 | Fisher et al. | | |
| 2014/0233620 A1* | 8/2014 | Bernheim | .............. | G05B 13/02 |
| | | | | 375/224 |
| 2016/0127515 A1* | 5/2016 | Kim | .................. | H04L 69/18 |
| | | | | 370/254 |

FOREIGN PATENT DOCUMENTS

| | | |
|---|---|---|
| JP | 2008-278740 A | 11/2008 |
| JP | 4254890 B2 | 4/2009 |
| JP | 2011-000894 A | 1/2011 |
| JP | 2012-171386 A | 9/2012 |
| JP | 5360300 B2 | 12/2013 |
| KR | 10-2007-0091762 A | 9/2007 |
| KR | 10-2011-0063056 A | 6/2011 |

* cited by examiner

SYSTEM AND METHOD FOR REPROGRAMMING OF VEHICLE CONTROLLER

CROSS-REFERENCE TO RELATED APPLICATION

This application claims the benefit of and priority to Korean Patent Application No. 10-2014-0142096, filed on Oct. 20, 2014 in the Korean Intellectual Property Office, the disclosure of which is incorporated herein in its entirety by reference.

TECHNICAL FIELD

The present disclosure relates generally to a system and a method for reprogramming of a vehicle controller, and more particularly, to a technology of reprogramming a controller using PCL communication at the time of connecting a charger to a vehicle.

BACKGROUND

In recent years, the market for environmental vehicles, such as electric vehicles (EV), hybrid electric vehicles (HEV), plug-in hybrid electric vehicles (PHEV), and fuel cell electric vehicles (FCEV), is rapidly growing. As a result, the construction of infrastructure for charging an EV battery has also advanced.

The EV is configured to include several kinds of controllers, in which software for each controller may be updated by controller area network (CAN) communication. However, it takes considerable time to update the software for each controller by CAN communication, and there is typically a need for separate dedicated equipment to update the software. Further, a user typically has to visit a specialized center to update the software for each controller of the EV.

SUMMARY

The present disclosure has been made to solve the above-mentioned problems occurring in the related art while advantages achieved by the prior art are maintained intact.

An aspect of the present disclosure provides a system and a method for reprogramming of a vehicle controller to simultaneously reprogram a plurality of controllers using PCL communication at the time of connecting a charger for charging a battery of a vehicle.

According embodiments of the present disclosure, a system for reprogramming a vehicle controller includes: a plurality of controllers equipped in a vehicle; a battery configured to provide operation power to the plurality of controllers; and a charging control device configured to sense a connection with a charger providing charging power from an external power source to the battery, request latest software version information corresponding to each of the plurality of controllers from the charger through power-line communication (PLC) while the charging power is provided from the charger to the battery, confirm the requested latest software version information, receive upgrade data from the charger, and transmit the received upgrade data to the plurality of controllers. The charging control device assigns different communication frequency bands to the plurality of controllers, respectively, for communicating with the plurality of controllers using PLC, and transmits the upgrade data using the respective communication frequency band assigned to the plurality of controllers.

The charging control device may determine the software version which is installed in the plurality of controllers through the PLC when the connection with the charger is sensed, compare the confirmed the software version with the latest software version information provided from the charger, and request the upgrade data from the charger for a controller of the plurality of controllers in which the latest version software is not installed according to the comparison.

The charging control device may send a request for a reprogramming mode conversion of the controller in which the latest version software is not installed and transmit the upgrade data provided from the charger to the controller converted into the reprogramming mode.

The latest software version information and the upgrade data may be provided from a management server which communicates with the charger.

The battery may include at least one of a 12 V battery and a high-voltage battery.

The charging control device may transmit the upgrade data to the plurality of controllers through any one of a PLC line connected to a 12 V battery and a PLC line connected to a high-voltage battery.

The charging control device may perform frequency modulation into a communication frequency band assigned to the plurality of controllers, respectively, using any one of quadrature phase shift keying (QPSK) and quadrature amplitude modulation (QAM).

The charging control device may be an on-board charger (OBC).

The plurality of controllers may include at least one of a voltage DC-DC converter, a micro control unit (MCU), an inverter, a motor, a vehicle control unit (VCU), and a battery management system (BMS).

Furthermore, according to embodiments of the present disclosure, a method for reprogramming a vehicle controller includes: determining a software version installed in each of a plurality of controllers equipped in a vehicle through PLC while charging power is provided from a charger to a battery, the charging power being provided from an external power source; requesting latest software version information corresponding to the plurality of controllers from the charger through the PLC; comparing the requested latest software version information to the software version installed in each of the plurality of controllers; requesting upgrade data from the charger for a controller of the plurality of controllers in which the latest software version is not installed according to the comparison; sending a request for a reprogramming mode conversion to the controller in which the latest software version is not installed; transmitting the upgrade data provided from the charger to the controller converted into the reprogramming mode.

The method may further include: receiving, at a charging control device, latest software version information corresponding to each of the plurality of controllers provided from a management server communicating with the charger.

The method may further include: receiving, at a charging control device, upgrade data for each of the plurality of controllers in which the latest software version is not installed from a management server communicating with the charger.

The method may further include: assigning different communication frequency bands to the plurality of controllers, respectively, for communicating with the plurality of controllers using PLC; and transmitting upgrade data using the respective communication frequency band assigned to the plurality of controllers.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
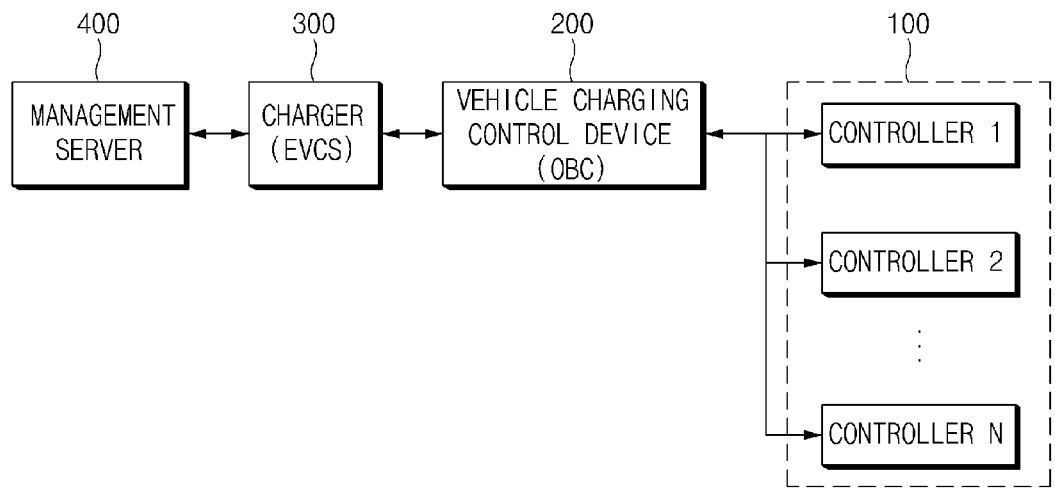
FIG. 1 is a diagram illustrating a configuration of a reprogramming system of a vehicle controller according to embodiments of the present disclosure.

It is to be noted that technical terms used in the specification are used for describing embodiments and do not limit the present disclosure. In addition, unless indicated otherwise in the specification, it is to be understood that all the technical terms used in the specification are construed as meaning as those that are generally understood by those who skilled in the art and as excessively comprehensive meanings and excessively reduced meanings. In addition, when the technical terms used in the specification are wrongly technical terms that do not accurately indicate the technical spirit of the present disclosure, it is to be understood that the terms are replaced with the technical terms understood by those skilled in the art. Further, the general terms used in the present disclosure must be understood according to the terms defined by the dictionary or the context and should not be excessively reduced meanings.

In addition, singular forms used in the specification are intended to include plural forms unless the context clearly indicates otherwise. In the specification, it is to be noted that the terms "comprising" or "including', and the like, are not be construed as necessarily including several components or several steps described in the specification and some of the above components or steps may not be included or additional components or steps are construed as being further included.

Terms including an ordinal number such as first, second, or the like, used in the present specification may be used to describe various components. However, these components are not limited to these terms. The terms are used to differentiate one component from other components. For example, the 'first' component may be named the 'second' component, and vice versa, without departing from the scope of the present disclosure.

It is understood that the tem "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in more detail with reference to the accompanying drawings. The same reference numerals will be used to describe the same or like components, independent of the reference numerals and an overlapped description of the same components will be omitted. Further, when it is determined that the detailed description of the known art related to the present disclosure may obscure the gist of the present disclosure, the detailed description thereof will be omitted. In addition, it is to be noted that the accompanying drawings are provided only in order to allow the spirit of the present disclosure to be easily understood and is to be interpreted as limiting the spirit of the present disclosure.

FIG. 1 is a diagram illustrating a configuration of a reprogramming system of a vehicle controller according to embodiments of the present disclosure.

Referring to FIG. 1, a system for reprogramming a vehicle controller (hereinafter, referred to as "reprogramming system") according to the present disclosure may include a plurality of controllers 100 and a charging control device 200. Although not illustrated in FIG. 1, the system of reprogramming a vehicle controller may further include a battery supplying operation power to the plurality of controllers 100.

The plurality of controllers 100 may include all the controllers which are equipped in the vehicle. The plurality of controllers 100 are operated by being supplied with the operation power from the battery.

For example, the plurality of controllers 100 may include at least one of a voltage DC-DC converter, a micro control unit (MCU), an inverter, a motor, a vehicle control unit (VCU), and a battery management system (BMS). Any controller which is equipped in the vehicle to be supplied with the operation power from the battery may be applied.

The charging control device 200 is equipped in the vehicle to control the charging of the battery which supplied the operation power to the plurality of controllers 100. In this case, the charging control device 200 monitors a connection state of a charger 300 outside the vehicle and if it is determined that the charger 300 is connected to the vehicle, provides charging power provided from the charger 300 to the battery. As an example, the charging control device 200 may be an on-board charger (OBC).

Further, the charging control device 200 may be connected to the plurality of controllers 100, which is connected to the battery, through a PLC line to perform PLC. In this case, the charging control device 200 may request software version information to the plurality of controllers 100 through the PLC while the charging power is provided to the battery and receive the requested software version information. Further, the charging control device 200 may process a reprogramming operation for the plurality of controllers 100 through the PLC while the charging power is provided to the battery.

The charger 300 provides the charging power from an external power source to the vehicle. For example, the charger 300 may be an electric vehicle charging system (EVCS). The charger 300 may be connected to the charging control device 200 of the vehicle through a charging cable. In this case, the charger 300 may provide the charging power to the vehicle.

Further, the charger 300 may perform the PLC with the charging control device 200 connected thereto. For example, the charger 300 may receive the vehicle charging information through the PLC with the charging control device 200. Further, the charger 300 may receive a request for the latest software version information on the plurality of controllers 100 from the charging control device 200. Here, the charger 300 may communicate with a management server 400 which manages the software information on the vehicle and may request the latest software version information on each controller 100 to the management server 400 according to the request of the charging control device 200. In this case, the charger 300 may receive the latest software version information on each controller 100 from the management server 400 and provide the received latest software version information to the charging control device 200.

Further, the charger 300 may receive a request for the latest data for each controller 100 or a specific controller from the charging control device 200. In this case, the charger 300 may request the latest data, for example, upgrade data for the corresponding controller 100 to the management server 400 and receive the requested upgrade data and may provide the upgrade data received from the management server 400 to the charging control device 200. The management server 400 may provide the upgrade data corresponding to each controller 100 requested by the charger 300 to the charger 300.

Accordingly, the charging control device 200 may transmit the upgrade data for each controller 100 received through the charger 300 to the corresponding controllers 100, respectively, to process a reprogramming operation for the corresponding controllers 100, while the charging power provided from the charger 300 is provided to the battery. Further, the charging control device 200 may also provide the reprogramming result for each controller 100 to the management server 400 through the charger 300.

Figure 2:
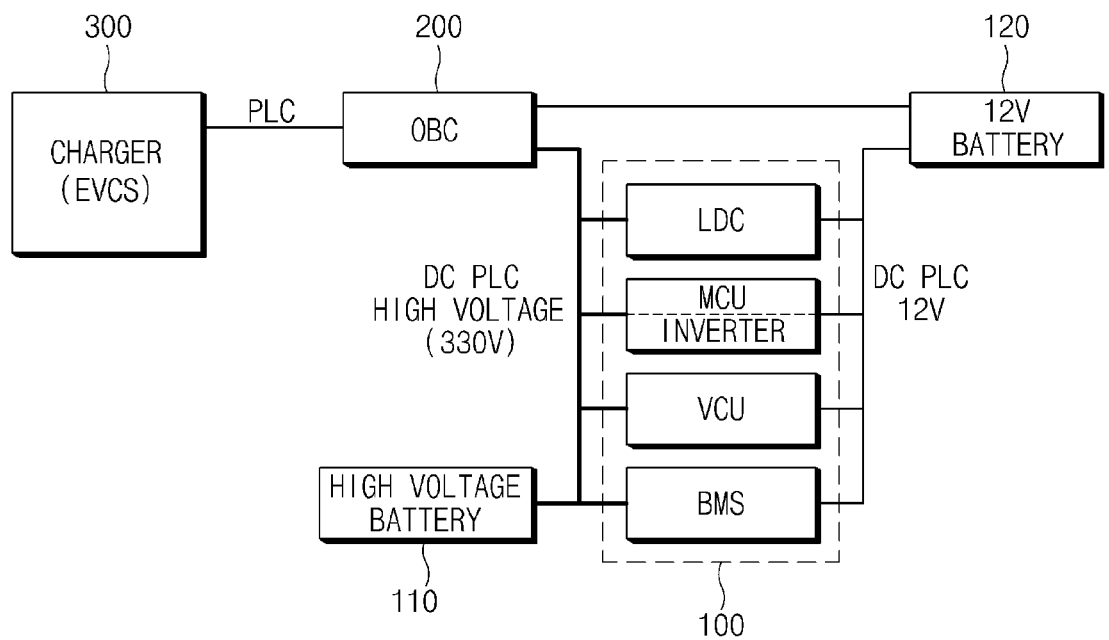
FIG. 2 is a diagram illustrating a PLC structure of a reprogramming system of a vehicle controller according to embodiments of the present disclosure.

FIG. 2 is a diagram illustrating a PLC structure of a reprogramming system of a vehicle controller according to embodiments of the present disclosure.

As illustrated in FIG. 2, when being connected to the vehicle, the charger 300 is connected to the charging control device 200 through the PLC line.

Further, the charging control device 200 is connected to the battery, that is, a 12 V battery and a high-voltage battery, respectively, and may provide the charging power provided through the charger 300 to the 12 V battery and the high-voltage battery, respectively. The plurality of controllers 100, for example, an LDC, an MCU, an inverter, a VCU, a BMS, etc., which are equipped in the vehicle may be connected to the 12 V battery and the high-voltage battery, respective and may be connected to the charging control device 200 through the PLC line connected to the 12 V battery and the high-voltage battery.

Accordingly, the charging control device 200 may perform the PLC with each controller 100 through a 12 V PLC line and a high-voltage PLC line while the charging power provided from the charger 300 is provided to the 12 V battery and the high-voltage battery at the time of connecting the charger 300 to the vehicle. In this case, the charging control device 200 may confirm the software version information on each controller 100 through the PLC and request the latest data through the PLC with the charger 300.

Further, the charging control device 200 may receive the upgrade data for each controller 100 provided from the charger 300 through the PLC and provide the received upgrade data to each controller 100 connected through the PLC. Here, the charging control may transmit the upgrade data to each controller 100 while providing the charging power to the battery, thereby increasing the reprogramming efficiency.

Figure 3:
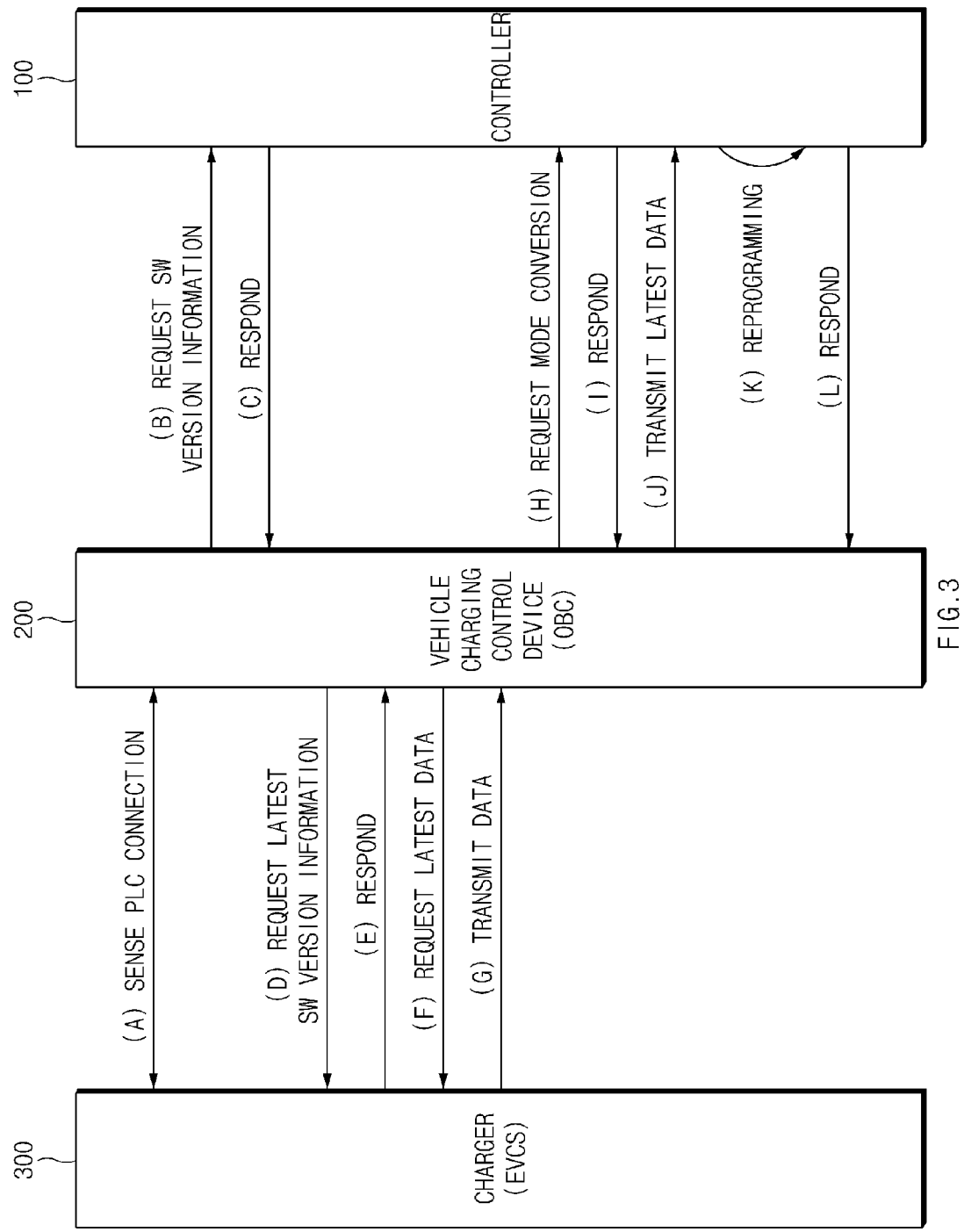
FIG. 3 is an exemplified diagram referenced to describe a reprogramming operation of the reprogramming system of the vehicle controller according to embodiments of the present disclosure.

FIG. 3 is an exemplified diagram referenced to describe a reprogramming operation of the reprogramming system of the vehicle controller according to embodiments of the present disclosure.

FIG. 3 illustrates a signal flow transferred among the controller 100, the charging control device 200, and the charger 300 for reprogramming the controller 100 while the charging control device 200 provides the charging power provided through the charger 300 to the battery.

As in (a), when the PLC connection between the charger 300 and the charging control device 200 is sensed, the charging control device 200 requests the software version information to the controller 100 through the PLC as in (b). In this case, as in (c), the controller 100 transmits the software version information as a response to the request of the charging control device 200.

Further, as in (d), the charging control device 200 requests the latest software version information on the controller 100 to the charger 300 In this case, the charging control device 200 may transmit identification information on the controller 100 together. In this case, the charger 300 may request the latest software version information on the controller 100 to the management server and as in (e), may respond to the charging control device 200, including the latest software version information provided from the management server which communicates with the charger 300.

In this case, the charging control device 200 may compare the software version information received through (c) and (e) to determine whether the software version of the controller 100 is the latest version and if it is determined that the latest software version is not installed, as in (f), the charging control device 200 may request the latest data for the controller 100 to the charger 300.

The charger 300 may request the latest data for the corresponding controller 100 to the management server according to the request of the charging control device 200 and the management server may provide the upgrade data for the corresponding controller 100 to the charger 300. Therefore, the charger 300 may transmit the upgrade data for the controller 100 provided from the management server to the charging control device 200 as in (g).

The charging control device 200 may request the conversion into the reprogramming mode to the controller 100 as in (h) when receiving the upgrade data for the controller 100 from the charger 300, and the controller 100 may perform the conversion into the reprogramming mode according to the request of the charging control device 200 and then respond to the charging control device 200 as in (i). When the controller 100 is converted into the reprogramming mode, the charging control device 200 transmits the latest data, that is, the upgrade data for the controller 100 to the controller 100 as in (j) and the controller 100 performs the reprogramming using the upgrade data received from the charging control device 200 as in (k). When the reprogramming is completed, the controller 100 may respond to the charging control device 200, including a reprogramming result as in (l).

As such, when the external charger 300 is connected to the vehicle, the reprogramming system according to the present disclosure simultaneously performs the battery charging of the vehicle and the reprogramming for the plurality of controllers 100 in the vehicle, thereby efficiently processing the charging of the battery and the reprogramming.

Figure 4:
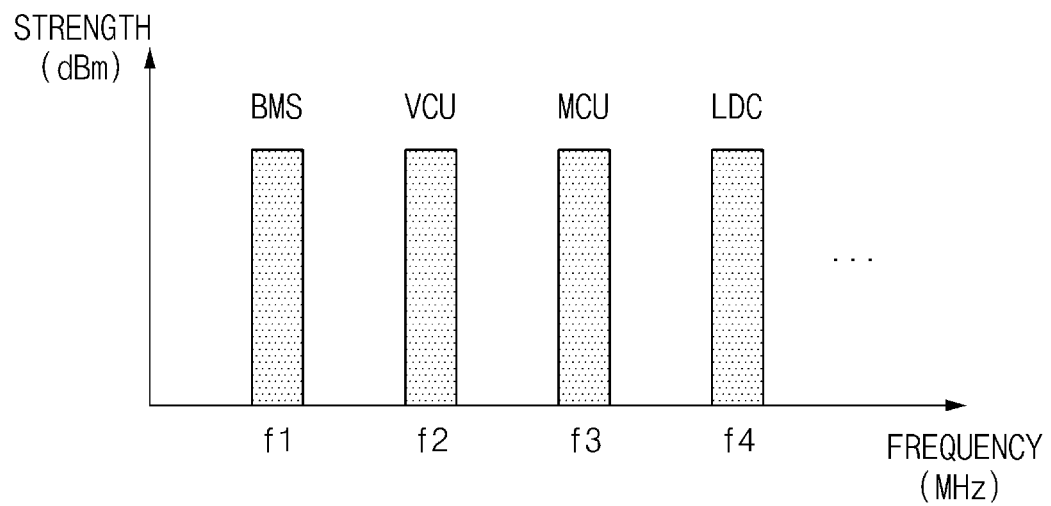
FIGS. 4 and 5 are exemplified diagrams referenced to describe a communication frequency band of the reprogramming system of the vehicle controller according to embodiments of the present disclosure.
Figure 5:
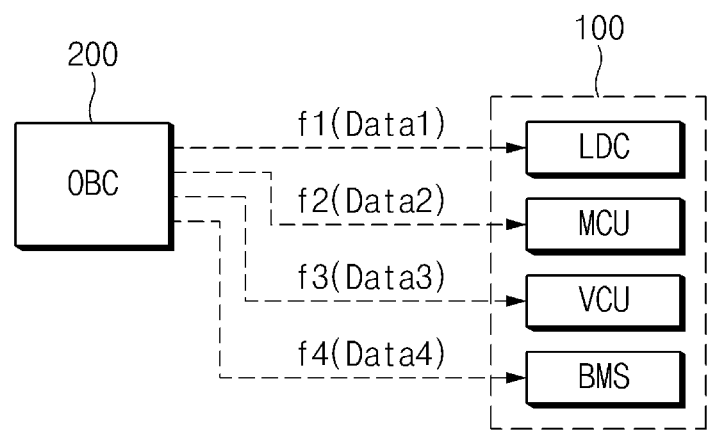

FIGS. 4 and 5 are exemplified diagrams referenced to describe a communication frequency band of the reprogramming system of the vehicle controller according to embodiments of the present disclosure.

The reprogramming system according to the present disclosure simultaneously performs the charging of the battery of the vehicle and the reprogramming for the plurality of controllers 100 in the vehicle when the external charger is connected to the vehicle. In this case, to simultaneously process the reprogramming for the plurality of controllers 100, the charging control device 200 divides the frequency band in which the PLC with the plurality of controllers 100 may be made to assign different communication frequency bands to the plurality of controllers 100, respectively. Therefore, the charging control device 200 uses different communication frequency bands assigned to the plurality of controllers 100 to transmit the upgrade data for each controller 100, thereby simultaneously processing the reprogramming for the plurality of controllers 100.

For example, as illustrated in FIG. 4, the charging control device 200 may assign a communication frequency band of f1 to the BMS, a communication frequency band of f2 to the VCU, a communication frequency band of f3 to the MCU, and a communication frequency band of f4 to the LDC. Here, the f1, f2, f3, and f4 are considered as a band in which interference does not occur. In this case, the charging control device 200 may assign a communication frequency band at a predetermined interval within a range in which the interference does not occur.

In this case, if it is assumed that the upgrade data received from the charger in response to the BMS is Data1, the upgrade data received from the charger in response to the VCU is Data2, the upgrade data received from the charger in response to the MCU is Data3, and the upgrade data received from the charger in response to the LDC is Data4, as illustrated in FIG. 5, the charging control device 200 may transmit the Data1 to the BMS through the communication frequency band, transmit the Data2 to the VCU through the communication frequency band of f2, transmit the Data3 to the MCU through the communication frequency band of f3, and transmit the Data4 to the LDC through the communication frequency band of f4. The Data1, Data2, Data3, and Data4 are each transmitted to the BMS, the VCU, the MCU, and the LDC, respectively, through the f1, f2, f3, and f4, and therefore may be simultaneously transmitted with interfering with each other.

Figure 6A:
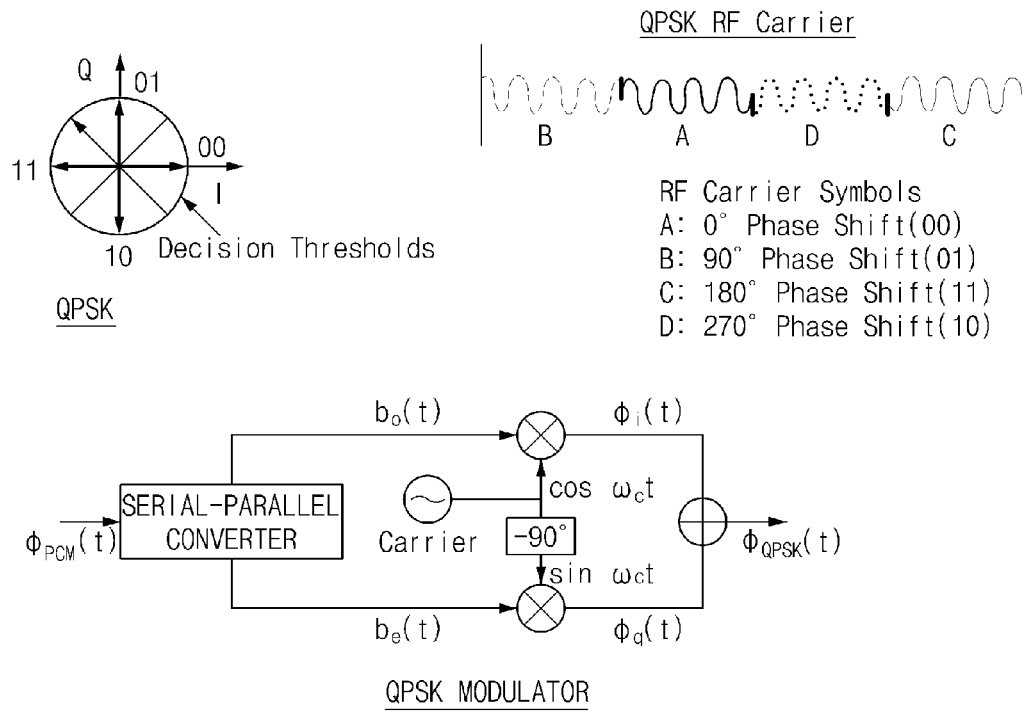
FIGS. 6A and 6B are exemplified diagrams referenced to describe a frequency modulation scheme applied to the reprogramming system of the vehicle controller according to embodiments of the present disclosure.
Figure 6B:
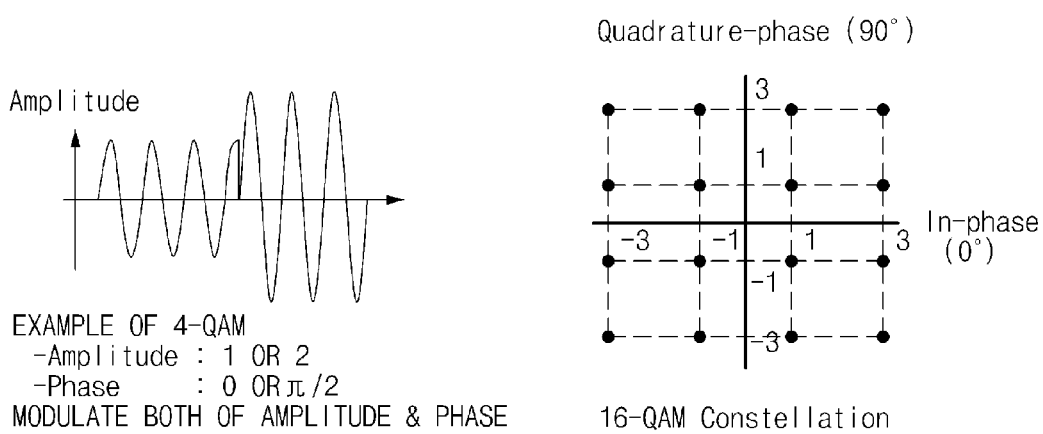

FIGS. 6A and 6B are exemplified diagrams referenced to describe a frequency modulation scheme applied to the reprogramming system of the vehicle controller according to embodiments of the present disclosure.

When the Data1, Data2, Data3, and Data4 are transmitted to the BMS, the VCU, the MCU, and the LDC in FIG. 5, as illustrated in FIGS. 6A and 6B, the charging control device 200 uses any one of quadrature phase shift keying (QPSK) and quadrature amplitude modulation (QAM) to frequency-modulate signals including the Data1, Data2, Data3, and Data4 into the f1, f2, f3, and f4, respectively. In this case, the signals which are frequency-modulated by the QPSK, the QAM, and the like are each transmitted to the BMS, the VCU, the MCU, and the LDC.

An operation flow of the apparatus for controlling school bus based driving according to embodiments of the present disclosure configured as described above will be described below in detail.

Figure 7:
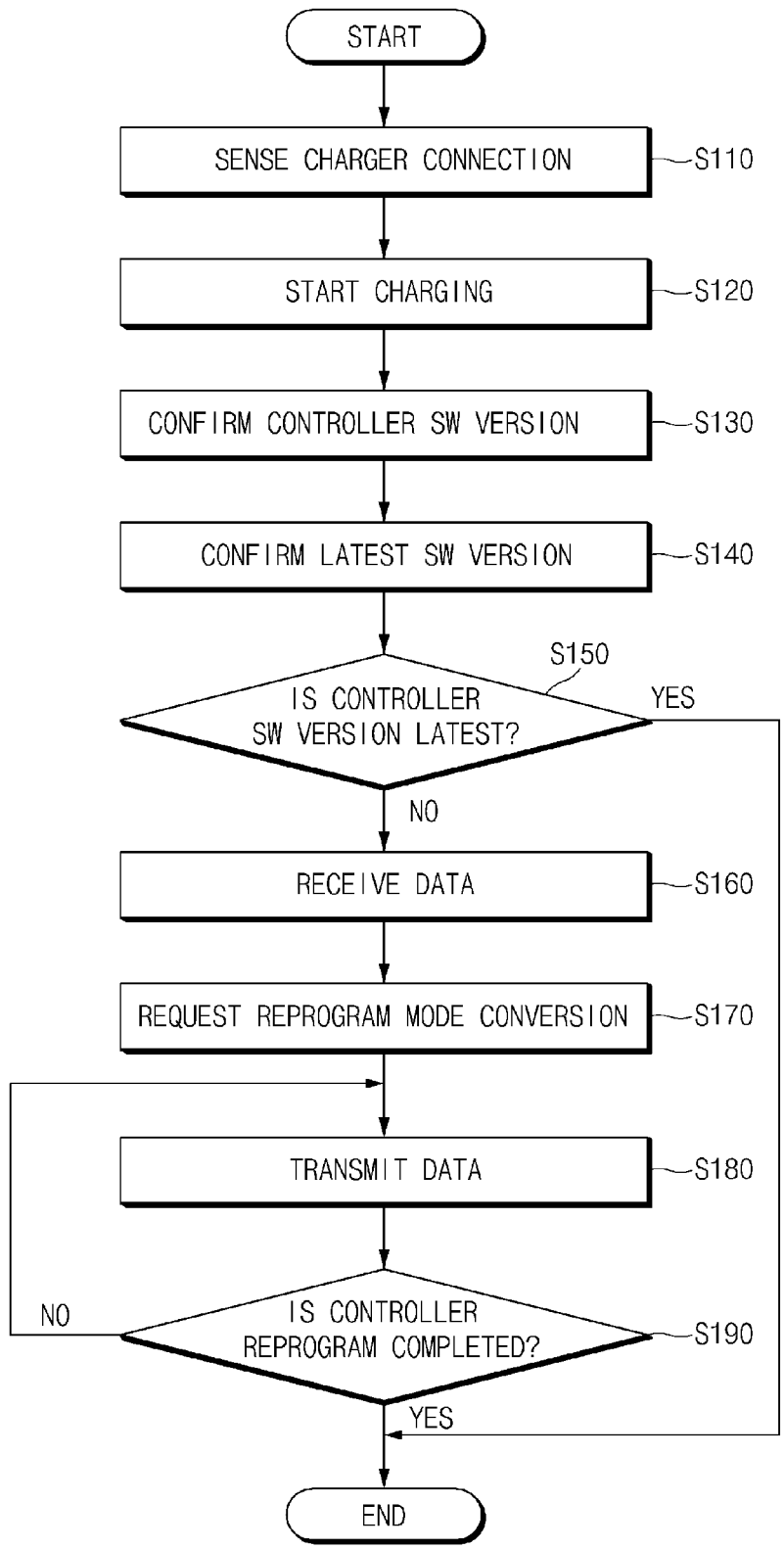
FIG. 7 is a flowchart illustrating an operation flow of a method for reprogramming a vehicle controller according to embodiments of the present disclosure.

FIG. 7 is a flow chart illustrating an operation flow of a method for reprogramming a vehicle controller according to embodiments of the present disclosure.

Referring to FIG. 7, when the charging control device in the reprogramming system senses the connection of the charger outside the vehicle (S110), the battery in the vehicle, for example, the 12 V battery and the high-voltage battery starts to be charged (S120).

At the same time, the charging control device requests the software version information to the controller in the vehicle through the PLC to determine the software version of each controller (S130) and confirm the latest software version information on each controller provided from the management server through the charger (S140).

In this case, the charging control device compares the software version information received during processes 'S130' and 'S140' to determine whether the software version installed in the controller is the latest version. If it is determined that the software installed in the controller is not the latest version (S150), the charging control device may request the latest data to the charger to receive the latest data for the corresponding controller, that is, the upgrade data (S160).

Next, the charging control device requests the conversion into the reprogram mode for reprogramming of the controller (S170), and if it is determined that the controller is converted into the reprogram mode, the charging control device transmits the upgrade data received during the process 'S160' to the controller (S180).

Therefore, the controller may use the upgrade data received from the charging control device during the process 'S180' to perform the reprogram and transmit the reprogramming performance result to the charging control device. The charging control device may confirm the reprogramming result depending on the response from the controller. If the reprogram of the controller fails and thus the reprogramming is not completed (S190), the charging control device may again perform the process 'S180'. Further, when the reprogramming of the controller is completed, the relevant operation may end.

As described above, according to embodiments of the present disclosure, it is possible to increase the charging and reprogramming efficiency by simultaneously reprogramming the plurality of controllers using the PLC while the battery of the vehicle is charged by the charger connected to the vehicle. Further, it is possible to perform the reprogramming with high reliability without interference by assigning different communication frequency bands to each controller to perform the reprogramming.

The processes may be directly implemented by a hardware module and a software module which are executed by a processor, or a combination thereof. The software module may reside in a storage medium such as an RAM memory, a flash memory, an ROM memory, an EPROM memory, an EEPROM memory, a register, a hard disk, a detachable disk, and a CD-ROM, that is, a memory and/or a storage. The exemplified storage media are coupled with the processor which may read information from the storage media and write the information in the storage medium. As another method, the storage medium may be integrated with the processor. The processor and the storage medium may reside in an application specific integrated circuit (ASIC). The ASIC may reside in a user terminal. As another method, the processor and the storage medium may reside in the user terminal as an individual component.

Hereinabove, although the present disclosure has been described by specific matters such as detailed components, and the like, embodiments, and the accompanying drawings, they have been provided only for assisting in the entire understanding of the present disclosure. Therefore, the present disclosure is not limited to the above-mentioned exemplary embodiments, but may be variously modified and altered by those skilled in the art to which the present disclosure pertains without departing from the spirit and scope of the present disclosure. Therefore, the present disclosure is not to be limited to the above-mentioned embodiments. That is, the following claims as well as all contents modified equally or equivalently to the claims are to fall within the scopes and spirits of the disclosure.

What is claimed is:

1. A system for reprogramming a vehicle controller, comprising:
    a plurality of controllers equipped in a vehicle;
    a battery configured to provide operation power to the plurality of controllers; and
    a charging control device configured to sense a connection with a charger providing charging power from an external power source to the battery, request latest software version information corresponding to each of the plurality of controllers from the charger through power-line communication (PLC) while the charging power is provided from the charger to the battery, confirm the requested latest software version information, receive upgrade data from the charger, and transmit the received upgrade data to the plurality of controllers,
    wherein the charging control device assigns different communication frequency bands to the plurality of controllers, respectively, for communicating with the plurality of controllers using PLC, and transmits the upgrade data using the respective communication frequency band assigned to the plurality of controllers.

2. The system according to claim 1, wherein the charging control device determines the software version which is installed in the plurality of controllers through the PLC when the connection with the charger is sensed, compares the confirmed the software version with the latest software version information provided from the charger, and requests the upgrade data from the charger for a controller of the plurality of controllers in which the latest version software is not installed according to the comparison.

3. The system according to claim 2, wherein the charging control device sends a request for a reprogramming mode conversion to the controller in which the latest version software is not installed and transmits the upgrade data provided from the charger to the controller converted into the reprogramming mode.

4. The system according to claim 1, wherein the latest software version information and the upgrade data are provided from a management server which communicates with the charger.

5. The system according to claim 4, wherein the charging control device transmits the upgrade data to the plurality of controllers through any one of a PLC line connected to a 12V battery and a PLC line connected to a high-voltage battery.

6. The system according to claim 1, wherein the battery includes at least one of a 12V battery and a high-voltage battery.

7. The system according to claim 1, wherein the charging control device performs frequency modulation into a communication frequency band assigned to the plurality of controllers, respectively, using any one of quadrature phase shift keying (QPSK) and quadrature amplitude modulation (QAM).

8. The system according to claim 1, wherein the charging control device is an on-board charger (OBC).

9. The system according to claim 1, wherein the plurality of controllers includes at least one of: a voltage DC-DC converter, a micro control unit (MCU), an inverter, a motor, a vehicle control unit (VCU), and a battery management system (BMS).

10. A method for reprogramming a vehicle controller, comprising:
    determining, by a charging control device, a software version installed in each of a plurality of controllers equipped in a vehicle through power-line communication (PLC) while charging power is provided from a charger to a battery, the charging power being provided from an external power source;
    requesting, by the charging control device, latest software version information corresponding to the plurality of controllers from the charger through the PLC;
    comparing, by the charging control device, the requested latest software version information to the software version installed in each of the plurality of controllers;
    requesting, by the charging control device, upgrade data from the charger for a controller of the plurality of controllers in which the latest software version is not installed according to the comparison;
    sending, by the charging control device, a request for a reprogramming mode conversion to the controller in which the latest software version is not installed;
    assigning, by the charging control device, different communication frequency bands to each of the plurality of controllers for communicating with the plurality of controllers through PLC; and
    transmitting, by the charging control device, the upgrade data to the plurality of controllers using the respective communication frequency band assigned to each of the plurality of controllers.

11. The method according to claim 10, further comprising:
    receiving, by the charging control device, latest software version information corresponding to each of the plurality of controllers provided from a management server communicating with the charger.

12. The method according to claim 10, further comprising:
    receiving, by the charging control device, upgrade data for each of the plurality of controllers in which the latest software version is not installed from a management server communicating with the charger.

* * * * *